E. SAWYER.
Land Marker.
No. 107,294. Patented Sept. 13, 1870.
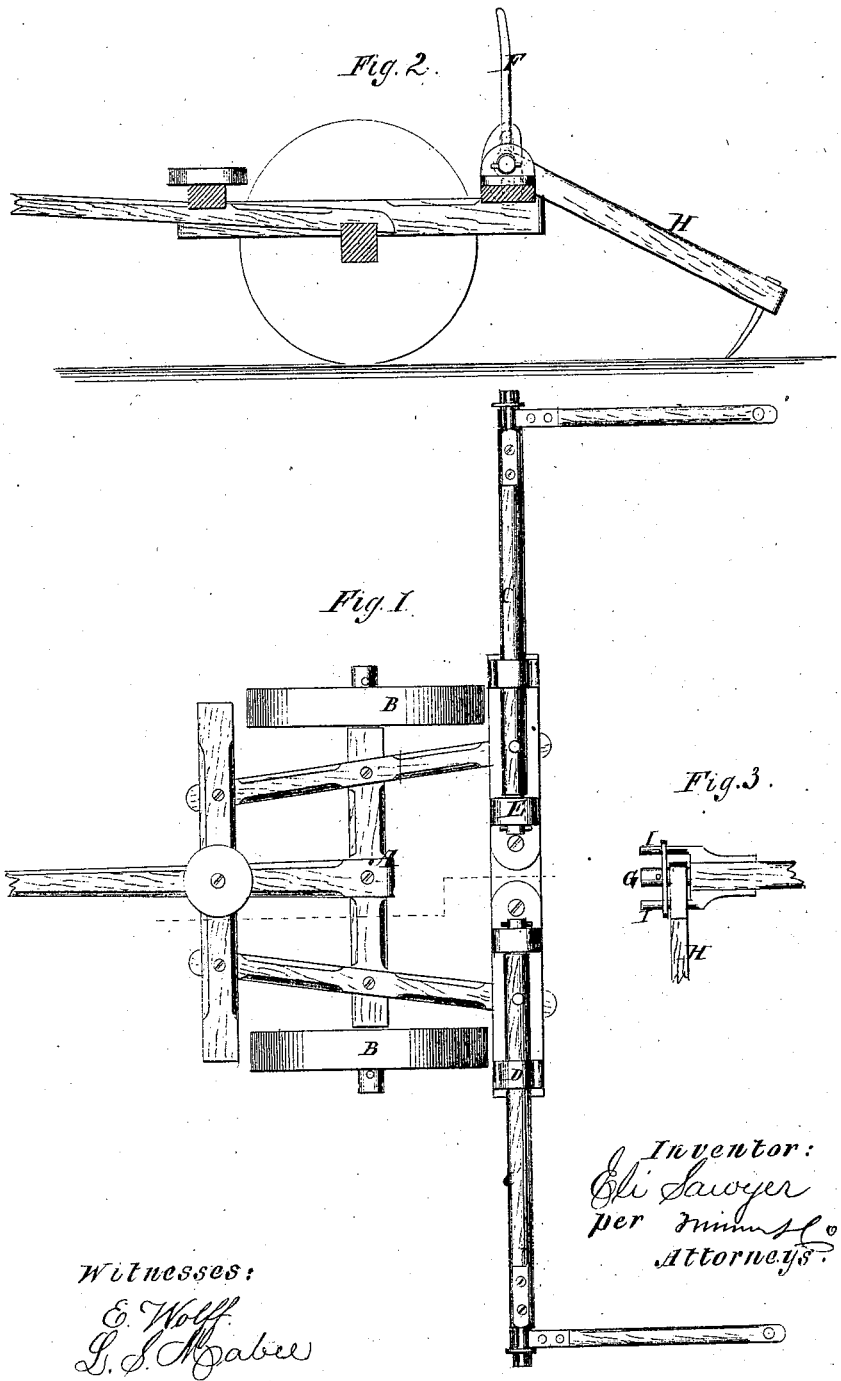

United States Patent Office.

ELI SAWYER, OF MADISON, IOWA.

Letters Patent No. 107,294, dated September 13, 1870.

IMPROVEMENT IN MARKING ATTACHMENT TO CORN-PLANTERS.

The Schedule referred to in these Letters Patent and making part of the same.

*To all whom it may concern:*

Be it known that I, ELI SAWYER, of Madison, in the county of Jones and State of Iowa, have invented a new and improved Marking Attachment for Corn-Planters; and I do hereby declare that the following is a full, clear, and exact description thereof, which will enable others skilled in the art to make and use the same, reference being had to the accompanying drawing forming part of this specification.

This invention relates to improvements in corn-planters, and consists in the application to the frame of one or two arms projecting laterally therefrom the distance required for the width of the rows, capable of oscillation, and provided with levers for turning them, to the outer ends of which markers are so hinged that they will work up and down freely, as required by the uneven ground, and so that, the arms being turned by the hand-levers, the markers will be raised above the ground, and be supported when not required to be in action, all as hereinafter described.

Figure 1 is a plan view of my improved machine;

Figure 2 is a section on the line *x x*; and

Figure 3 is a section of one of the arms and markers, showing the construction of the hinged joint.

Similar letters of reference indicate corresponding parts.

A is the frame of the machine, and

B, the wheel whereon it is mounted.

C represents the laterally-projecting arms, which, in this instance, are arranged behind the wheels, but which may be placed before, if preferred.

They are journaled to the frame at D E in suitable bearings, in which they may turn; and they have handles or levers, F, attached to them, and so arranged that they may be reached by the driver or dropper to turn the arms when the machine is in operation.

The outer ends of these arms have the journals G for the connection of the marker-stocks H, and they have also the projecting fingers I arranged parallel with the journals on opposite sides, and so that when they are turned down to let the markers work on the ground, the said fingers will not interfere with the proper vibration of the said marker, but, when the arms are turned upward, the lower fingers I, striking against the under side of the marker, will raise it nearly to a vertical position, so that the operator may at any time raise the marker above the ground, to clear stones, roots, or other obstructions.

When it is desired to throw the markers out of action altogether, they may be tilted forward after being so raised beyond the vertical line, when they will rest on the other fingers I, that is, those which are at the top when the markers are working, and they will be thereby supported above the ground, as the levers F, resting on the frame, will prevent the arms C from turning, so as to let the markers fall to the ground on the forward side of the arms.

These markers are used mainly for making marks by which to guide the truck for driving in straight lines for planting. Only one is used at a time; the two are needed for alternate action, as the back and forth movements of the machine present different sides to the unplanted part of the field.

Having thus described my invention,

I claim as new and desire to secure by Letters Patent—

The combination, with the frame of the corn-planting machine, of the oscillating arms C, markers H, and hand-levers F, when the stocks are pivoted to the arms, and all arranged substantially as specified.

ELI SAWYER.

Witnesses:
 GEORGE W. LANDON,
 SIMON N. LANDON.